United States Patent [19]

Liu

[11] Patent Number: 5,160,664
[45] Date of Patent: Nov. 3, 1992

[54] HIGH OUTPUT MONODISPERSE AEROSOL GENERATOR

[75] Inventor: Benjamin Y. H. Liu, North Oaks, Minn.

[73] Assignee: MSP Corporation, Minneapolis, Minn.

[21] Appl. No.: 708,306

[22] Filed: May 31, 1991

[51] Int. Cl.[5] ............... C09K 3/30; B01F 5/02
[52] U.S. Cl. ................. 252/305; 252/321; 252/358; 261/18.1; 261/78.2; 239/338
[58] Field of Search .............. 252/305, 308, 321; 261/18.1, 78.2; 239/338

[56] References Cited

U.S. PATENT DOCUMENTS

| | | | |
|---|---|---|---|
| H799 | 7/1990 | Farthing et al. | 55/392 |
| 3,808,147 | 8/1974 | Dymet et al. | 252/305 |
| 4,380,505 | 4/1983 | Wittenhorst | 252/359 R |
| 4,459,219 | 7/1984 | Kiley | 252/305 |
| 4,636,364 | 1/1987 | Geyer et al. | 422/162 |
| 4,855,112 | 8/1989 | Adcock | 422/186.23 |
| 4,917,830 | 4/1990 | Ortiz et al. | 261/18.1 |
| 4,963,289 | 10/1990 | Ortiz et al. | 252/305 |
| 4,992,206 | 2/1991 | Waldron | 252/305 |
| 5,059,351 | 10/1991 | Carlon et al. | 252/408.1 |
| 5,059,352 | 10/1991 | Carlon et al. | 252/408.1 |

OTHER PUBLICATIONS

Article by Benjamin Y. H. Liu et al., entitled *A Condensation Aerosol Generator for Producing Monodispersed Aerosols In the Size Range, 0.036μ to 1.3μ,* "Journal de Recherches Atmospheriques", pp. 397–406, 1966.

*Primary Examiner*—Richard D. Lovering
*Assistant Examiner*—N. Bhat
*Attorney, Agent, or Firm*—Kinney & Lange

[57] ABSTRACT

An aerosol generator used to produce, selectively and rapidly, an aerosol that has a specific particle size and is at a known specific concentration. The generator comprises a plurality of aerosol material atomizers that can be selectively used to obtain different atomized aerosol particles that results in different size when combined with the output of a particle seed atomizer. Particles can be selectively operated to provide, quickly and conveniently, a range of individual particle sizes. The seed atomizer output is mixed with the aerosol atomizer output and passed through a unique, compact heating section for heating the mixture in a manner to provide a high flow rate with low pressure drop. The fluid is passed through a condenser to condense known size particles in the fluid stream, which then can be used as desired, for example to test the efficiency of filters.

14 Claims, 1 Drawing Sheet

FIG. 1

HIGH OUTPUT MONODISPERSE AEROSOL GENERATOR

BACKGROUND OF THE INVENTION

The present invention relates to an apparatus and method for providing a high volume output of monodisperse aerosols and to permit changing the particle size generated simply and conveniently. Additionally, the high volume is attainable by permitting rapid transfer of heat to atomized materials to cause droplets to form a vapor, which when passed through a condenser will cause condensation of the aerosol material onto provided seed material particles to form a desired particle size.

It is desired in industrial settings to have aerosols that contain a known particle size in a monodisperse aerosol (substantially only one particle size carried in the fluid). These aerosols are used for calibrating and testing items such as filters and other applications where trapping of particular particle sizes is of importance.

In the prior art, the generation of monodispersed aerosols using a generator that involves vaporization and subsequent condensation, is described in an article by Benjamin Y.H. Liu et al., entitled *A Condensation Aerosol Generator For Producing Monodispersed Aerosols In The Size Range, 0.036μ To 1.3μ*, "Journal de Recherches Atmospheriques", pp. 397–406, 1966. A single generator is utilized and the formation of the aerosol is controlled so that the correct particle size is generated. The process includes vaporizing a high boiling point material by heating it, and then cooling the vapor to form the monodisperse aerosol of a standard size. Because many of the organic materials with suitable vapor pressure-temperature relationships required for particle generation will thermally decompose when coming into direct physical contact with heated surfaces at high temperatures, the Liu et al. article described a method whereby the aerosol material is first atomized to form a droplet spray, which is then heated to form the vapors. The heat is transferred to the droplets through an intervening air layer and, thus, direct contact between the aerosol material and the heated surface was avoided to avoid the material decomposition problem.

An additional problem arose with the apparatus shown in the Liu et al. article when more than one particle size was desired for running a series of experiments or for other purposes. The aerosol atomizer had to be emptied and refilled with the proper solution.

The present invention relates to improvements to the device shown in the Liu et al. article that makes it adaptable to commercial evaluations where more than one particle size is needed for testing, and which will provide for high flow rates without large physical size by providing for a compact heater and condenser.

The basic principle of use in the Liu et al. article is that the aerosol material will be atomized to form a droplet spray, which is then heated to form a vapor. The vapor is condensed in the presence of a seed material that forms nuclei for condensation. If the concentration of the aerosol material in the aerosol atomizer is maintained, the particle size in the monodisperse aerosol will be uniform.

SUMMARY OF THE INVENTION

The present invention relates to an apparatus and method for generating an aerosol of uniform particle size, and being able to change the monodisperse aerosol particle size at selected times easily and reliably. The products used for aerosol generation include DOP (dioctyl phthalate) or DOS (dioctyl sebacate) which are two materials that are organic with suitable vapor pressure-temperature relationships required for aerosol generation. High boiling point, low vapor pressure materials are used as aerosol materials. When the preferred liquid aerosol material is placed into a solution with a solvent, for instance isopropyl alcohol for DOP or DOS, the resultant aerosol size is determined by the concentration of the liquid organic compound aerosol material in the solution. The present apparatus provides for separate sources of several different concentrations of the aerosol materials that can be selectively atomized, along with an atomized flow of a seed material in solution. The atomized products are mixed and passed through a heating zone to vaporize the liquids at a level which will not destroy the solid seed material particles, and then subsequently the vapor stream is condensed The aerosol material will condense onto the solid seed material and form particles of a uniform size dependent upon the concentration of the solution of the aerosol material that was atomized. The size of the aerosol particles produced is determined by the ratio of the aerosol material (DOS or DOP) mass concentration relative to the concentration of the particles formed from the seed material.

The vaporized liquid carrier for the seed material and vaporized aerosol material solution will be passed through a condenser to cause the condensation of the aerosol material onto the particles of the seed material, which form particle nuclei, to obtain monodisperse particles of a known particle size.

The atomizers are controlled by separate controls, such as solenoid valves directing air under pressure into the atomizer. The atomizers can quickly be turned on and off so that the selected atomizer will operate in conjunction with the seed material atomizer and, in this way, different particle size aerosols can be generated reliably and economically.

The heating section uses a plurality of passageways that provide for a high fluid flow through a block that is surrounded by a compact heater. The temperature of the block can be controlled by a suitable controller and is set to a level that is sufficiently high to vaporize the aerosol material droplets formed by the atomizer, but not high enough to decompose the aerosol material or cause the solid seed material to vaporize.

The unit can thus be made quite compact, very reliable, and easily operated to obtain selected size particles across a range of sizes quickly and easily.

BRIEF DESCRIPTION OF THE DRAWINGS

The single FIG. is a schematic representation of an aerosol generator assembly made according to the present invention.

DETAILED DESCRIPTION OF THE PREFERRED EMBODIMENTS

A high output monodisperse aerosol generator made according to the present invention is illustrated schematically and generally at 10, and includes an atomizing section surrounded by dotted lines 12, that provides for atomized, small droplets of a seed material in a liquid carrier and droplets of a selected one of a number of liquid aerosol materials in different concentrations. The outputs of the atomizers are connected together.

The seed material is an atomizable liquid carrier which contains dissolved seed material in solution and which will form seed particles in air as the liquid carrier is vaporized. The small particles will form nuclei for condensation of the aerosol materials thereon, after the aerosol materials have been vaporized and recondensed.

The atomizing section 12 includes a seed material atomizer indicated generally at 14. The seed material atomizer is an atomizer of selected design such as that shown in the cited Liu et al. article. The seed material atomizer depends upon the introduction of compressed air through a nozzle which draws liquid into the compressed air stream and, as the air flows out of the atomizer, it carries small droplets of the liquid material from a reservoir. The seed material atomizer 14 is controlled by providing a supply of compressed air from a source 15 through a solenoid valve 16 and a conduit 18 to an internal nozzle (not shown) in the atomizer 14 which forces out the dissolved seed material in the form of air and small liquid droplets carried in the conduit 20. The seed material can, for example, be NaCl in solution with water that is carried into a conduit 20.

A plurality of aerosol material atomizers form part of the atomizer section 12 and include a first aerosol atomizer 22, a second aerosol atomizer 24, and a third aerosol atomizer 26. These atomizers are constructed in the same manner as the seed atomizer, but contain liquid aerosol particle forming materials. Each of the individual atomizers operate connected to a source of compressed air 28 through a separate solenoid 30, 32 and 34, respectively, which can be controlled from a computer indicated at 35. The solenoid valve 16 also can be controlled from the computer 35 in response to a selected program or push button inputs.

A program indicated at 37 can provide sequencing of controls to go through a series of tests, if desired.

Each of the atomizers 22, 24 and 26 contains a solution of a suitable liquid aerosol material, such as DOS, in different concentrations. For example, atomizer 22 can have a solution of 100% DOS (an oily liquid) to provide large aerosol particles, atomizer 24 could contain a solution of ten percent DOS dissolved in an isopropyl alcohol carrier to give a medium size particle, and a one percent solution of the DOS in isopropyl alcohol can be provided in aerosol atomizer 26.

Each of the aerosol atomizers has an output conduit carrying the droplets of the liquid contained in the atomizer, including conduit 22A connected to atomizer 22, conduit 24A connected to atomizer 24, and conduit 26A connected to atomizer 26. These conduits all join a common gallery or conduit 34 to which the conduit 20 is also attached, and this conduit 34 leads to a conduit section 36 that enters into a plenum chamber 38 formed in a heater housing 40. The conduit 36 and plenum chamber 38 form a region in which the flow of atomized seed material is mixed with the flow of atomized aerosol material.

The heater housing surrounds a heater block 42 which has a number of passageways 44 formed therethrough. These passageways or holes 44 are in a metal or heat conducting material block 42, and surrounded by a heater element 46 that is shown in the housing wall. The heater element 46 is controlled in response to a controller 48 that is connected to the heater elements, as shown schematically, and which can respond to a temperature sensed at a sensor 50, which is also shown only schematically.

The heater has a high number of openings in the block 42, so that the mixture of the atomized seed material and air, and the atomized aerosol material and air carried in the conduit 36, can easily flow through the block 42. The atomized seed material carrier and the atomized aerosol material are heated to vaporize the droplets formed in the atomizers. This vaporized or gaseous mixture is carried through a suitable conduit 52 to a plenum chamber 54 of a condenser section 56. The condenser section 56 comprises a plurality of individual tubes indicated at 58, that are spaced apart, and suitable cooling means shown at 60 directs cooling material over the tubes to cause condensation of the vaporized aerosol materials within the tubes onto the seed material particles forming nuclei on which the aerosol will condense to generate particles of uniform size. An outlet plenum chamber 62 leads to a conduit 64 which, in turn, can be connected to a test filter arrangement indicated at 66, or to some other use in an industrial application or a laboratory application.

The solenoid valves 30, 32 and 33, are individually operable, so that only one of the aerosol materials is atomized and provided to the heating section, and mixed with the atomized seed material at a time.

However, the particles provided to the test filter arrangement 66 can be changed in size by selecting a different one of the aerosol atomizers.

This arrangement for changing the size of the particles in the final aerosol can be done quickly and easily, as opposed to previous situations where separate solutions had to be replaced into each of the aerosol atomizer reservoirs.

DOS is a preferred material for the formation of particles. DOP also will work, as will other organic materials of suitable vapor pressure and temperature response, relative to the aerosol. For example, mineral oil also can be used.

When the output of one of the aerosol atomizers is combined with the output of the seed atomizer and the combined atomized outputs are then introduced into heating and condensation sections of the generator, a monodispersed aerosol of the specific particle size is produced.

The overall aerosol used is not flammable, if a seed material such as NaCl, which is water soluble, is used and the atomized seed stream having a high flow rate, say a rate ten times as high as the aerosol material stream. The combination stream then will be nonflammable and will have a low volatile organic compound content to make it unnecessary to treat the exhaust stream before it is discharged to the ambient atmosphere, for example, after it has passed through the test filter.

In operation, the seed atomizer will operate in the range of one cubic foot/minute flow and the flow from the aerosol material atomizers will be substantially lower than that. The overall arrangement solves the problem of having a high alcohol content in the discharge which is present in the prior art atomizer devices. In the present invention using a high volume of the separate seed material solution, which is nonflammable, is preferred over having the mixture of the seed material and the DOP or DOS dissolved in alcohol as the overall atomized mixture.

The present invention lets one custom make tests by being able to automatically and quickly select different sized particles because, as was stated, the size of the particle is determined by the alcohol in the solution to dissolve the aerosol material. In the heating, the alcohol is completely vaporized and discharged and does not recondense because of its high vapor pressure. Thus, that leaves the particle forming material, as shown, DOP, DOS or mineral oil, to condense onto the particles of seed material to form the uniform sized particles in the aerosol.

When testing filters for efficiency, such as filter 66, the particles in the fluid stream are counted prior to entry into the filter with a known particle counter 68 and after exit from the filter with a known particle counter 70. The filter efficiency at selected particle size can be determined very rapidly. A series of tests using three particle sizes, such as 0.1, 0.2 and 0.3 microns, can be conducted in a matter of 15 seconds. One second for the test and a two second or so delay between tests for the next size aerosol to be generated.

The heater block in the vaporizer section is made with maybe in the range of 10 to 100 openings through it to provide a large number of passageways and a substantial surface area for heat transfer. The evaporator section may be ten or twelve $\frac{3}{8}$ inch tubes over which cooling fluid is passed, such as air or water and the length may be only four inches or so.

The compressed air source is generally operated in a range of 30 to 50 psi, with about 35 psi as a standard regulated operating pressure.

The seed material comprises small solid particles in a solution that can be atomized. The ratio of the mass concentration of the aerosol material (high boiling point, low vapor pressure material) to the concentration of the seed material, which forms condensation nuclei, in the vaporized output of the heater. Very stable mass to nuclei ratios can be maintained with atomizers operating under regulated air pressures for each different concentration of the aerosol material. The output of the seed material atomizer can be maintained at a desired uniform level. Thus, the particle sizes that are formed are controlled by the concentration of the aerosol material and solvent in the respective atomizers for the aerosol material and the particle size generated from each concentration is very uniform.

The aerosol material can be any one of the known high boiling point, low vapor pressure liquid organic compounds used for generating monodispersed aerosols. As reported in the Liu et al. article cited above, work with such aerosol generators has been carried on since the 1940's. Thus, the term "high boiling point, low vapor pressure organic liquid aerosol material" is well known in the art. Boiling points in the range of 350° F. are preferred. The vapor pressure characteristics are such that the aerosol material must be stable at ambient temperatures.

The seed material also is selected from well known materials. Water soluble seed materials are preferred in order to reduce volatile organic compounds in the output. Anthracene can be used, but requires alcohol as a carrier or solvent. This causes environmental problems. As stated, NaCl dissolved in water is a specifically favorable seed material and it is used at a high ratio of the atomized materials relative to the atomized seed material, which is, when less than 100% concentration, dissolved in an alcohol. When the two streams are combined before heating, the mixture will usually be non-flammable and will have a low volatile organic compound content, so that the exhaust stream discharged from the filter will not have to be specially treated.

The heater section generally heats to in the range of 300° F. The heater used avoids vaporizing the seed material, and also avoids decomposing the aerosol material. The water or other liquid carrying the seed material used to form condensation nuclei will be turned to vapor, as well as the alcohol carrier for the aerosol material, (and the aerosol material itself) such as DOS, DOP or mineral oil. These low vapor pressure materials are generally oily materials.

Although the present invention has been described with reference to preferred embodiments, workers skilled in the art will recognize that changes may be made in form and detail without departing from the spirit and scope of the invention.

What is claimed is:

1. A high output monodisperse aerosol generator having a capability of providing a plurality of different particle size aerosol at an output comprising:
   a first atomizer;
   at least second and third atomizers;
   said first atomizer comprising a solution of a solid particle seed material, and said second and third atomizers having different concentrations of liquid aerosol materials, each of which concentrations will form a different size particle in an aerosol after vaporization and subsequent recondensing, the respective atomizers providing the seed material and aerosol material in droplet form in a gaseous suspension as atomize outputs;
   means for feeding the output of the seed atomizer, and selectively the output of one of the aerosol atomizers together as a mixture into a heater to cause vaporization of the atomized particles in gaseous suspension; and
   a condenser receiving the mixed vaporized atomizer outputs from the heater, to condense the aerosol material, the seed material forming nuclei for condensation of the aerosol material to obtain uniform sized particles which selectively are different size when a different one of the second and third atomizers is selected.

2. The aerosol generator of claim 1 and means for selecting the output of one of the second and third atomizers to be provided to the means for feeding.

3. The aerosol generator of claim 1, wherein said atomizers are operated by input of air as the gas forming a gaseous suspension, and solenoid valve means to control flow of air to and operation of each of the first, second and third atomizers.

4. The aerosol generator of claim 1, wherein said heater comprises a heater block of heat conductive material having a plurality of passageways therethrough, and a heating element in heat conducting relationship to the block.

5. The aerosol generator of claim 4, wherein the condenser is on an output side of the heater block, said condenser comprising a multiple tube condenser having a plurality of side by side tubes to provide for a high flow at low pressure drop to cause condensation of the aerosol material on the particles of seed material.

6. The aerosol generator of claim 5, and a test filter for collecting aerosol particles connected to receive the flow from the condenser.

7. The aerosol generator of claim 6, wherein there is a fourth atomizer having a different concentration of aerosol material from the second and third atomizers and having an output, and means for individually selectively and sequentially operating each of the second, third and fourth atomizers for the outputs thereof to be mixed with the output of the seed material atomizer to selectively provide different sized particles to the filter.

8. The aerosol generator of claim 1, wherein the aerosol material is a high boiling point, low vapor pressure liquid material having vaporization and recondensing characteristics substantially similar to dioctyl sebacate.

9. The aerosol generator of claim 1, wherein the aerosol material comprises a liquid material having a high boiling point and comprising an oily liquid material.

10. The aerosol generator of claim 1, wherein said seed material comprises NaCl dissolved in water and wherein the output of the first atomizer is substantially higher in flow rate than the output of the second and third atomizers.

11. The aerosol generator of claim 4, and controller means for controlling the temperature of the heating block.

12. An aerosol generator comprising:
a first atomizer for atomizing a solution of small solid seed material particles in a non-volatile solvent and providing an output flow of atomized seed material solution in response to air under pressure provided to the first atomizer;
a plurality of second atomizers, each individually providing an atomized liquid from a supply in the atomizer that has an aerosol material in a liquid form capable of a being atomized in response to air pressure being provided to the respective second atomizer and each second atomizer providing a different solution concentration;
means for selectively providing air under pressure to each one of the second atomizers at a separate time;
conduit means for receiving the flow from the first, and selectively from each of the second atomizers to permit mixing of the flows;
heating and condensing means for vaporizing the selected atomized aerosol material and the seed material solution and to cause the aerosol material to condense with the seed material forming nuclei for condensed particles of uniform size with each aerosol material selected forming a different size particle; and
a test device for receiving the selected size particles from the condensing means to permit testing the test device using a range of separate different uniform size particles.

13. The apparatus of claim 12, wherein said seed material atomizer provides an output flow rate that is substantially greater in volume that the flow rate from the second atomizers.

14. A method of selectively providing a selected one of a plurality of monodisperse particle sizes in an aerosol to a test filter comprising the steps of:
providing a solution of seed material that has small particles dissolved in a liquid carrier;
atomizing the seed material liquid carrier and particles to provide a seed material atomizer output;
providing a plurality of atomizers for atomizing separate concentrations of an aerosol forming material in liquid form and providing atomized outputs;
generating a flow of the atomized seed material and selectively mixing an individual one of the aerosol material atomizer outputs with the seed material atomizer output flow in a preselected sequence;
vaporizing the atomized liquid carrier of the seed material and the output of the selected aerosol material atomizer by heating the the seed material atomizer output and the selected aerosol material atomizer output;
condensing the vaporized aerosol material to form uniform size particles of one of the selected sizes with the seed material comprising a nucleus for each of the condensed particles of aerosol material;
providing the one selected size of particles to a test filter; and
selectively mixing a different one of the atomized outputs of aerosol material with the atomized seed material to provide second different selected size particles to such test filter.

* * * * *

UNITED STATES PATENT AND TRADEMARK OFFICE
CERTIFICATE OF CORRECTION

PATENT NO. : 5,160,664
DATED : November 3, 1992
INVENTOR(S) : BENJAMIN Y.J. LIU

It is certified that error appears in the above-identified patent and that said Letters Patent is hereby corrected as shown below:

Col. 6, line 18, delete "aerosol", insert "aerosols",

Col. 6, line 29, delete "atomize", insert "atomized"

Col. 8, line 9, after "volume", delete "that", insert "than"

Signed and Sealed this

Twenty-eighth Day of September, 1993

Attest:

BRUCE LEHMAN

Attesting Officer

Commissioner of Patents and Trademarks